United States Patent [19]
Tsukada

[11] Patent Number: 5,492,412
[45] Date of Patent: Feb. 20, 1996

[54] BALL RETAINER WITH AN INNER SEAL FOR A LINEAR GUIDE APPARATUS

[75] Inventor: Toru Tsukada, Gunma, Japan

[73] Assignee: NSK Ltd., Tokyo, Japan

[21] Appl. No.: 429,549

[22] Filed: Apr. 27, 1995

[30] Foreign Application Priority Data

Apr. 28, 1994 [JP] Japan .................... 6-092544

[51] Int. Cl.$^6$ .................... F16C 29/06; F16C 33/72
[52] U.S. Cl. .................... 384/15; 384/45
[58] Field of Search .................... 384/15, 43, 45, 384/49

[56] References Cited

U.S. PATENT DOCUMENTS

| | | | |
|---|---|---|---|
| 4,918,846 | 4/1990 | Tsukada | 384/15 |
| 4,929,095 | 5/1990 | Osawa | 384/45 |
| 5,011,300 | 4/1991 | Teramachi | 384/45 X |
| 5,137,371 | 8/1992 | Osawa | 384/45 |
| 5,275,492 | 1/1994 | Shirai | 384/15 |

FOREIGN PATENT DOCUMENTS 182330 6/1989 Japan .

Primary Examiner—Thomas R. Hannon
Attorney, Agent, or Firm—Sughrue, Mion, Zinn, Macpeak & Seas

[57] ABSTRACT

A linear guide apparatus provides a guide rail, a slider, balls, and a ball retainer having a core bar, ball holding portions and inner seal portions. The core bar, which is formed in a rectangle shape, has stopper portions at longitudinal ends and is coated with a rubber or synthetic resin member. The stopper portions project in an axial direction of the linear guide apparatus. The ball holding portions are arranged along both side edges of the ball retainer. The inner seal portions contact with at least an upper surface of a guide rail out of the upper surface of the guide rail and an inner surface of the slider confronting the upper surface of the guide rail. The ball retainer serves both functions of holding balls and sealing the balls.

7 Claims, 5 Drawing Sheets

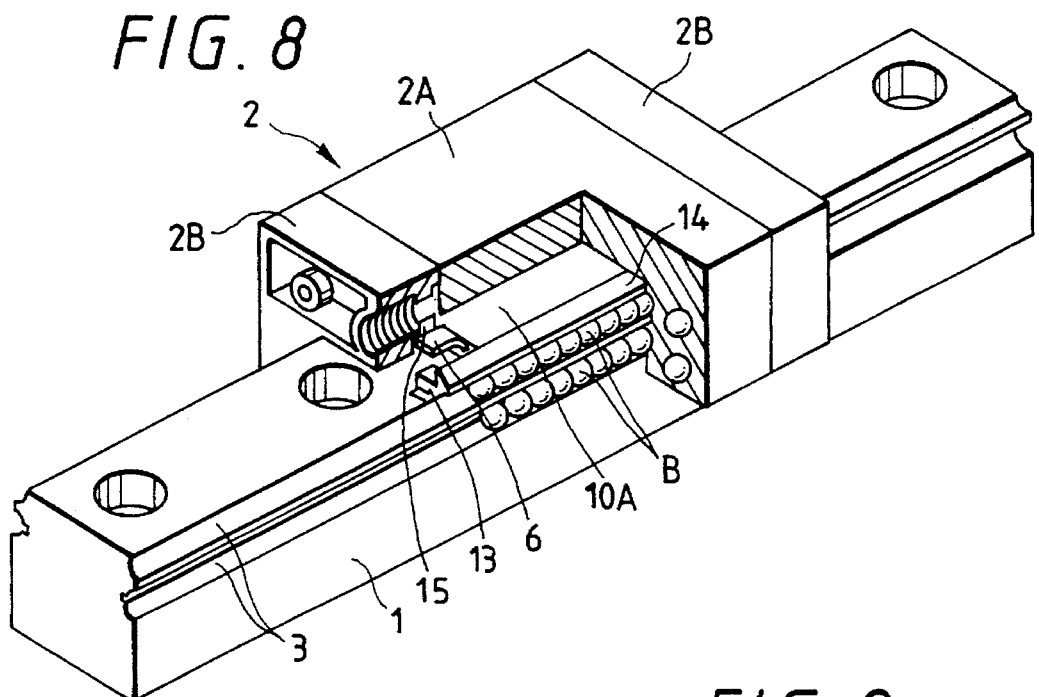
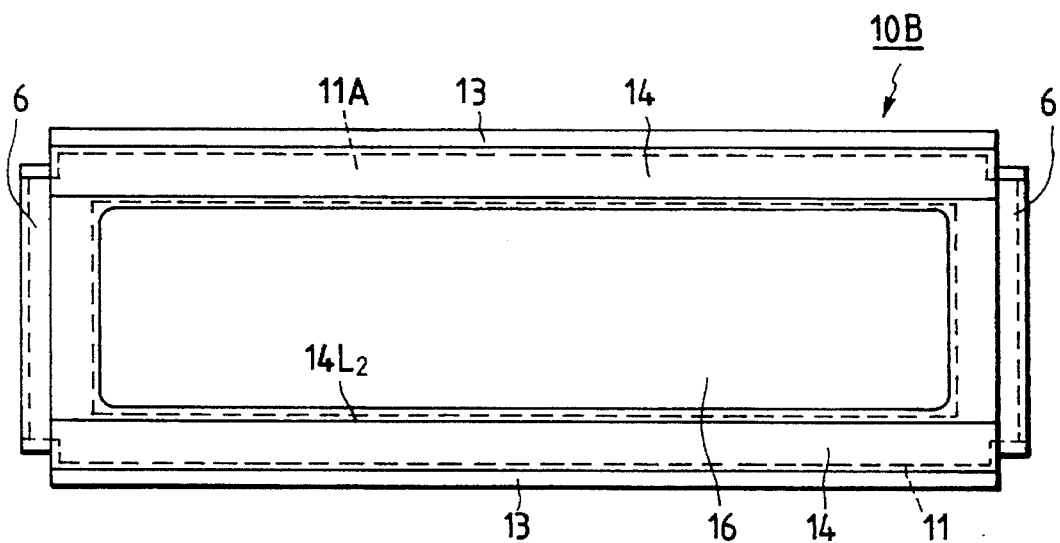
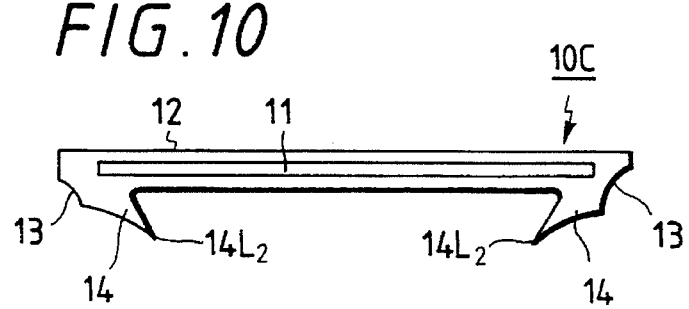

BALL RETAINER WITH AN INNER SEAL FOR A LINEAR GUIDE APPARATUS

BACKGROUND OF THE INVENTION

The present invention relates to an improvement of a ball retainer for holding balls while attached to a slider in a linear guide apparatus of such type that the slider is fitted over a guide rail so as to be movable relative to each other through the rolling of the balls.

A ball retainer for a conventional linear guide apparatus of this type is disclosed, for example, in U.S. Pat. No. 4,929,095 applied for by the present applicant.

As shown in FIG. 11, the linear guide apparatus to which the ball retainer 5 is attached is of such a type that ball rolling grooves 3 of a guide rail 1 are formed in rail side surfaces 1b and rail corners 1c. The ball retainer 5 is designed to hold balls B so as to prevent the balls from falling away, the balls being rollingly guided by the ball rolling grooves 3 formed at the guide rail corners 1c and by ball rolling grooves 4 formed in inner surfaces of a slider 2 so as to confront the ball rolling grooves 3. Thus, the ball retainer 5 is interposed between an upper surface 1a of the guide rail 1 and an inner surface 2a of the slider 2, the inner surface 2a confronting the surface 1a on a recess of the slider 2 that is fitted over the guide rail 1.

As shown in FIG. 12, the ball retainer 5 is formed into a substantially rectangular frame as viewed from the top thereof. Stopper portions 6 are projected at both longitudinal ends of the ball retainer 5, each stopper portion 6 extending in the axial direction of the linear guide apparatus. In addition, ball holding grooves 7 are formed at both side edges of the ball retainer 5 as shown in FIG. 13, each ball holding groove 7 being arcuate in horizontal section. The ball retainer 5 is designed to be attached to end caps 2B that are fitted with both ends of the slider 2 by fitting the stopper portions 6 into insertion recesses (not shown) formed in the fitting surface of each end cap 2B.

As shown in FIG. 11, a retainer 5A for holding the balls B within the ball rolling groove 4 in the lower part of the slider 2 is wire-shaped and is designed to receive in a retainer escape groove 8 formed in the bottom of the ball rolling groove 3 in the side surface of the guide rail 1 when the slider 2 is assembled into the guide rail 1.

On the other hand, a dustproof seal is disclosed in U.S. Pat. No. 4,918,846 and Unexamined Japanese Utility Model Publication No. Hei. 1-82330, which have been applied for by the present applicant. That is, the dustproof seals are designed to block the ingress of foreign matters into the ball rolling grooves within the slider with seal portions (an inner seal) arranged within the slider. The seals are arranged at the same position in the recess of the slider as that at which the ball retainer is arranged, and is slidingly contacted with the upper surface of the guide rail.

However, the conventional ball retainer 5 proposed in U.S. Pat. No. 4,929,095 is a single-functional product that 4 is designed to hold the balls B within the ball rolling grooves on the upper part of the slider 2. Therefore, there is a problem in which the foreign matters cannot be prevented from entering into both ball rolling grooves 3, 4.

On the other hand, the conventional inner seal disclosed in U.S. Pat. No. 4,918,846 and Unexamined Japanese Utility Model Publication No. Hei. 1-82330 is also a single-functional product only having the sealing function, and therefore cannot hold the balls. As a result, when the inner seal is attached to the slider of a linear guide apparatus of such a type that the upper ball rolling grooves 3 are formed at the rail corners 1c of the guide rail 1 as shown in FIG. 12, the balls cannot be held within the upper ball rolling grooves 4 on the side of the slider corresponding to the ball rolling grooves 3 formed at the rail corners. Thus, another problem is caused.

SUMMARY OF THE INVENTION

The present invention has been made in view of problems encountered by the conventional ball rolling retainers and inner seal. The object of the present invention is therefore to provide a ball retainer with an inner seal serving the double function of holding balls and sealing the balls, which ball retainer can be applied to a linear guide apparatus of a type that the ball rolling grooves of the guide rail on one side are formed at the rail corners.

To achieve the above object, a first aspect of the present invention is applied to a ball retainer with an inner seal for a linear guide apparatus that includes: a guide rail having axially extending ball rolling grooves in side surfaces and corner portions thereof; a slider having ball rolling grooves in inner side surfaces so as to confront the ball rolling grooves of the guide rail and being fitted over the guide rail so as to be movable in the axial direction relative to the guide rail; and a plurality of balls being loaded to both confronting ball rolling grooves. The ball retainer is attached within the slider of the linear guide apparatus. The ball retainer is formed by coating a core member thereof with rubber or synthetic resin. The core member is substantially rectangular and has stopper portions at both longitudinal ends thereof. The ball retainer has ball holding portions and inner seal portions along both side edges thereof. The ball holding portions hold the balls loaded to the ball rolling grooves of the slider, and the inner seal portions are slidingly contacted with an upper surface of the guide rail.

Further, a second aspect of the present invention is applied to a ball retainer with an inner seal for a linear guide apparatus in which the inner seal portions of the ball retainer according to the first aspect of the present invention are contacted with the upper surface of the guide rail and an inner surface of the slider confronting the upper surface of the guide rail.

Here, the core member can be provided with a substantially rectangular plate, or a substantially rectangular frame having the inside thereof hollowed. Thus, it is preferred that the substantially rectangular plate be used for the retainer as recited in the first aspect of the present invention, and that the substantially rectangular frame be used for the retainer as recited in the second aspect of the present invention.

The ball retainer of the present invention is operated as serving both of a retainer and dustproof seals for the balls. Accordingly, when the slider has been released from the guide rail, the ball retainer of the present invention securely holds the balls in the ball rolling grooves of the slider by the ball holding portions thereof. When the slider with the ball retainer attached thereto has been assembled to the guide rail, the inner seal portions of the ball retainer tightly contact with at least the upper surface of the guide rail out of the upper surface of the guide rail and the inner surface of the slider confronting the upper surface of the guide rail, thereby blocking the ingress of the foreign matters such as metal powder and dust adhering to the upper surface of the guide rail from entering into the ball rolling portions.

Further, to attach the ball retainer of the present invention to the slider, the stopper portions formed at both longitudinal ends of the ball retainer are fitted into the stopper portions in the bottom of each end cap of the slider. Since the stopper portions of the ball retainer are coated with rubber or synthetic resin, the stopper portions of the ball retainer can be securely fixed to the corresponding stopper portions of the end caps without setting any severe fitting tolerance.

Moreover, the balls can be loaded to the ball rolling grooves of the slider sequentially with ease by taking advantage of the resiliency of the rubber or synthetic resin with which the core member is coated.

Still further, the ball retainer formed by coating a plate-shaped core member with rubber or synthetic resin can serves a noise-preventing function by absorbing the rolling sound derived from the ball rolling portions during the operation of the linear guide apparatus.

On the other hand, the ball retainer formed by coating a frame-shaped core member with rubber or synthetic resin can take advantage of both the resiliency of the core member itself as well as the resiliency of the coating member at the time the balls are loaded to the ball rolling grooves of the slider. Therefore, the balls can be sequentially loaded into the ball rolling grooves with more ease.

BRIEF DESCRIPTION OF THE DRAWINGS

In the accompanying drawings:

FIG. 8 is a partially cutaway perspective view of a linear guide apparatus to which the ball retainer of FIG. 5 is attached;

FIG. 9 is a plan view of a ball retainer, which serves as a third embodiment of the present invention;

FIG. 10 is a side view of a ball retainer, which serves as a fourth embodiment of the present invention;

DETAILED DESCRIPTION OF THE PREFERRED EMBODIMENTS

Figure 1:
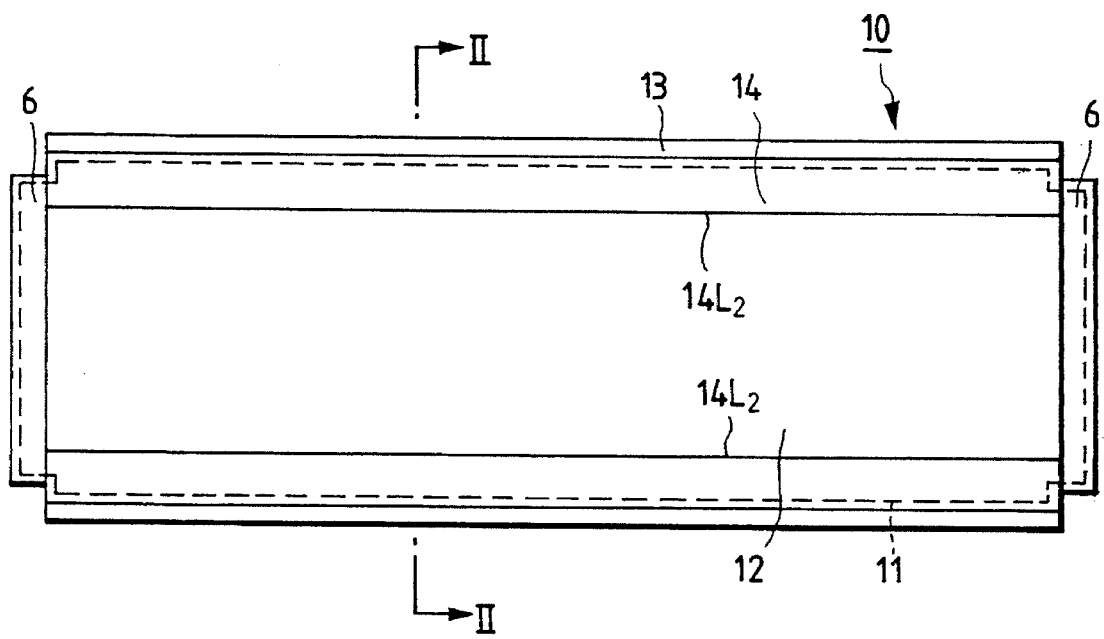
FIG. 1 is a plan view of a ball retainer, which serves as a first embodiment of the present invention.
Figure 2:
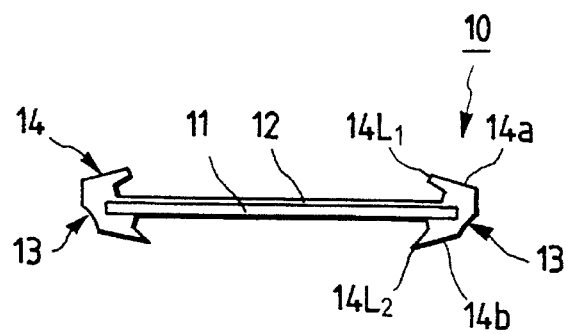
FIG. 2 is a side view of FIG. 1.

Embodiments of the present invention will now be described with reference to the accompanying drawings. The same or like parts and components as those of the conventional example will be denoted as the same reference numerals.

FIGS. 1 to 4 show a first embodiment of the present invention. The ball retainer 10 is formed by coating the whole of a core member 11 with rubber or synthetic resin (hereinafter referred to collectively as "the rubber member") 12. The core member 11 is made of an iron or nonmetallic plate in a rectangle-shape, and has stopper portions 6 projected at both longitudinal ends in the axial directions of the linear guide apparatus. The rubber member 12 is so formed that both edge portions extending along the length of the core member 11 are thick-walled and that ball holding portions 13, each of which is an arcuate recessed groove, extend along such longitudinal edge portions.

Figure 3:
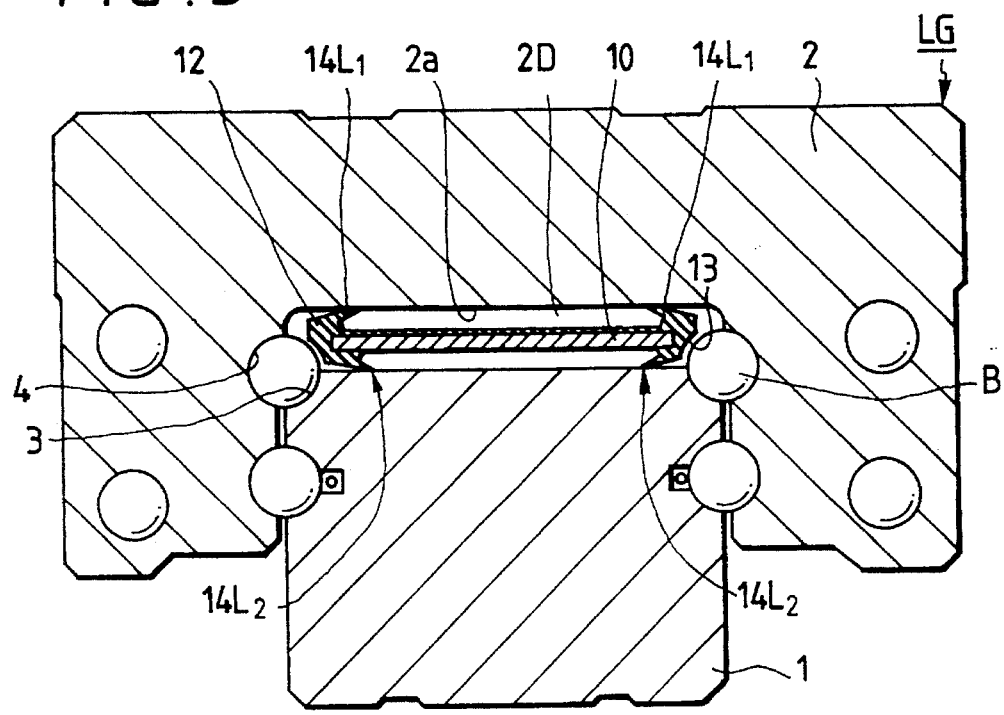
FIG. 3 is a sectional view of a linear guide apparatus to which the ball retainer of FIG. 1 is attached.

Further, inner seal portions 14 also extend along such longitudinal edge portions in parallel with the ball holding portions 13. Each inner seal 14 has upper and lower projecting strips 14a, 14b arrow-shaped in cross section, the projecting strips 14a, 14b being tapered down toward the inside from the rubber member 12 of which edge portions are thick-walled. The tip of the upper projecting strip 14a forms an inner seal lip $14L_1$ that contacts with a slider inner surface 2a within the recess 2D of the slider 2 with the ball holding portions 13 attached to the slider as shown in FIG. 3. In addition, the tip of the lower projecting strip 14b forms an inner seal lip $14L_2$ that contacts with the upper surface 1a of a guide rail 1 in a similar condition.

The operation of the ball retainer 10 will be described next.

Figure 4:
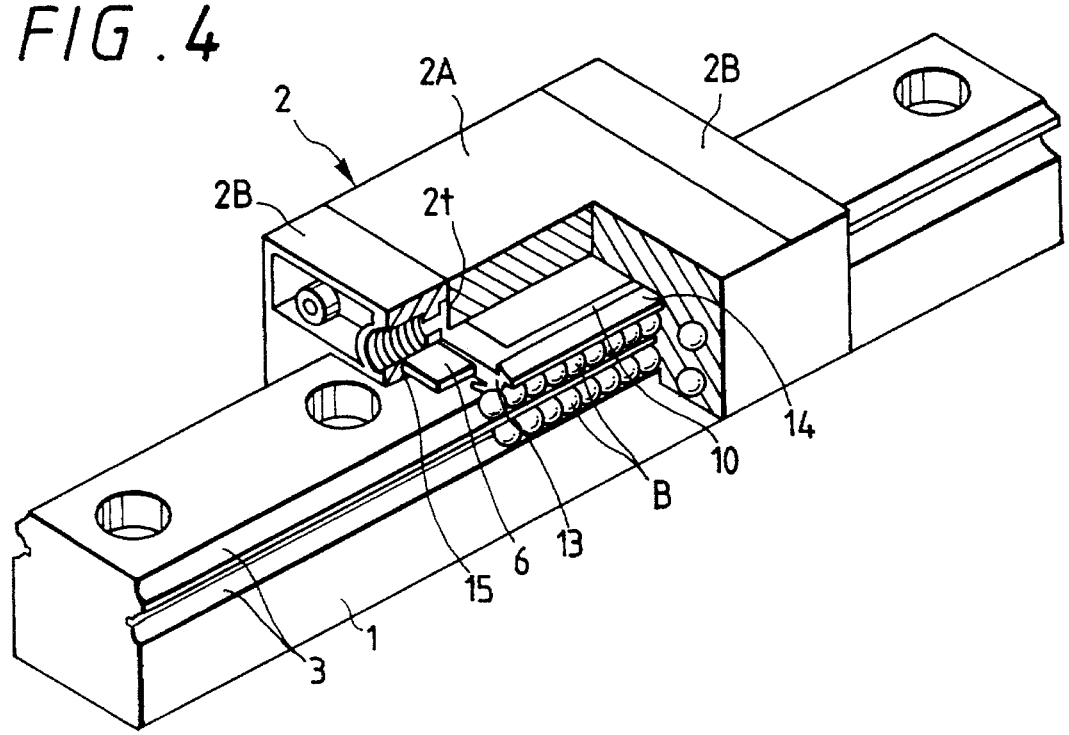
FIG. 4 is a partially cutaway perspective view of the linear guide apparatus.
Figure 5:
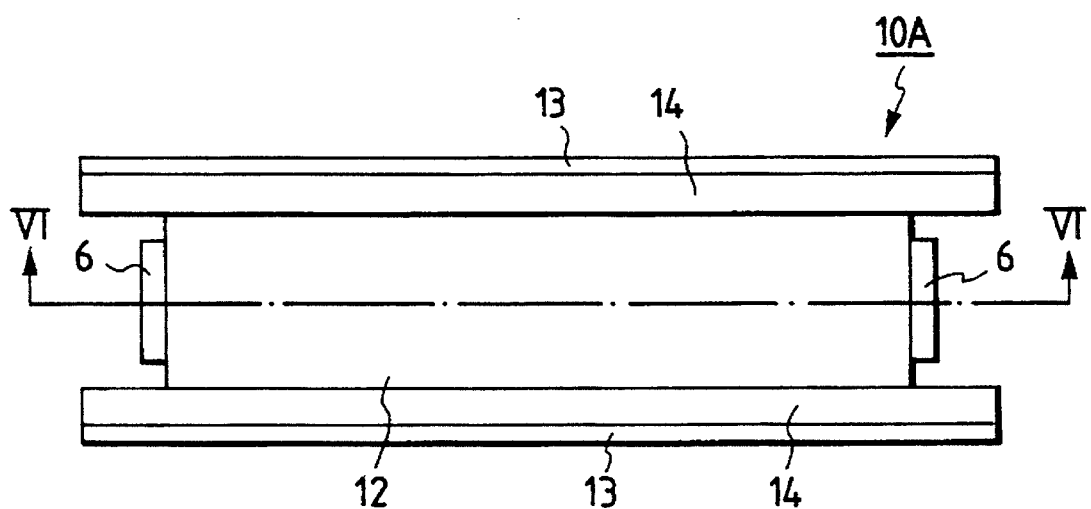
FIG. 5 is a plan view of a ball retainer, which serves as a second embodiment of the present invention.
Figure 6:
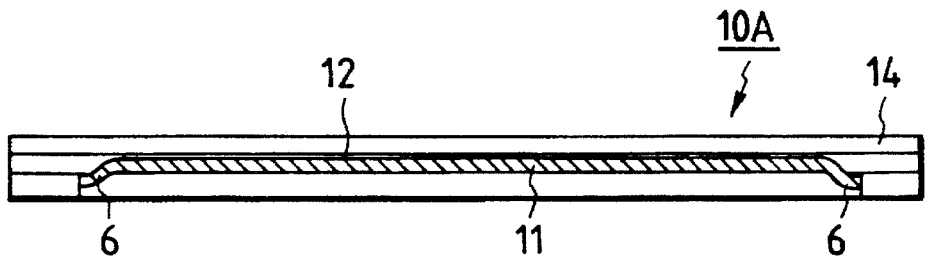
FIG. 6 is a sectional view taken along a line VI—VI of FIG. 5.
Figure 7:
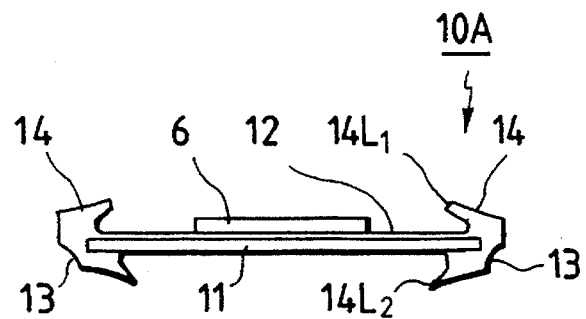
FIG. 7 is a side view of FIG. 5.
Figure 11:
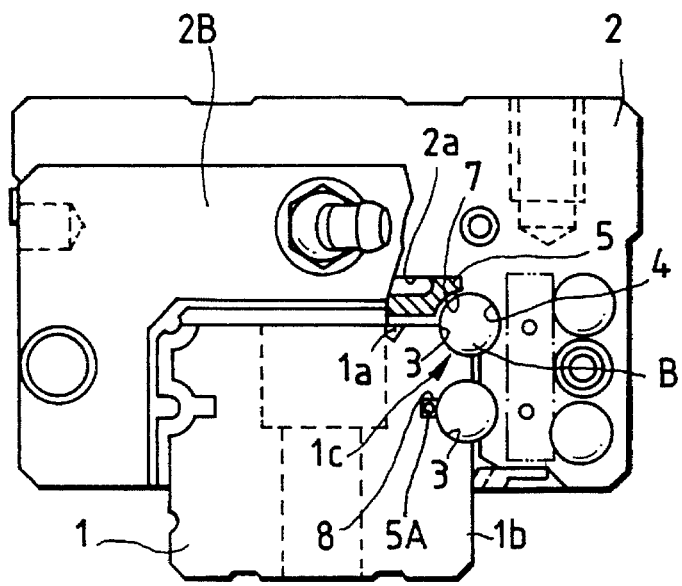
FIG. 11 is a front view of a linear guide apparatus to which a conventional ball retainer is attached thereto with part of an end cap cut away therefrom.
Figure 12:
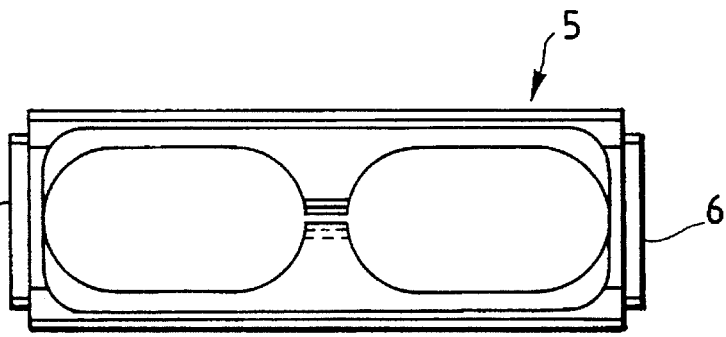
FIG. 12 is a plan view of the conventional ball retainer.
Figure 13:
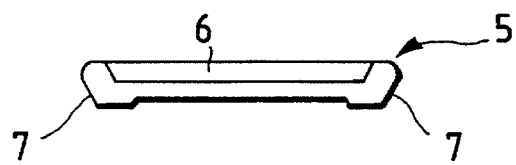
FIG. 13 is a front view of the ball retainer of FIG. 11.

As shown in FIG. 4, the ball retainer 10 is attached to the recess 2D of the slider 2 with the stopper portions 6 on the ends of the ball retainer 10 being fitted into the fitting recesses 15 formed in the end surface 2t of each end cap 2B that is fitted with the corresponding end of the slider main body 2A of the slider 2. Since these stopper portions 6 are coated with rubber or synthetic resin, the stopper portions 6 can be fitted into the fitting recesses 15 securely without setting any severe fitting tolerance.

After the ball retainer 10 has been attached to the slider, balls B are loaded to ball rolling grooves 4 of the slider 2. During this operation, the balls B can be sequentially loaded to the ball rolling grooves 4 with ease by taking advantage of the resiliency of the rubber member 12 with which the core member 11 is coated.

Since the balls B loaded to the ball rolling grooves 4 are securely held in the ball rolling grooves 4 of the slider 2 and supported by the ball holding portions 13 of the ball retainer 10, there is no possibility that the balls B may fall away the ball rolling grooves 4.

The slider to which the ball retainer 10 is attached and the balls B are loaded is assembled to the guide rail 1. The inner seal lip $14L_1$ of each inner seal portion 14 of the ball retainer 10 prevents the foreign matters entering into the recess 2D of the slider 2 from scattering into the balls B and the ball rolling grooves 3, 4 because the inner seal lip $14L_1$ tightly contacts with the slider inner surface 2a within the recess 2D. In addition, the inner seal lip $14L_2$ prevents the foreign matters entering into the upper surface 1a of the guide rail 1 from scattering into the balls B and the ball rolling grooves 3, 4. As a result of these operations of the inner seal lips, a lubricant in the balls B and the ball rolling grooves 3, 4 is kept clean at all the time, thereby ensuring the long life of the linear guide apparatus.

Further, in the case of the first embodiment, the balls B and the ball rolling grooves 3, 4 are perfectly sealed by the ball retainer 10 formed by coating the whole of the plate-shaped core member 11 with the rubber member 12. As a result, the rolling sound of the balls B derived from their moving in the ball rolling grooves 3, 4 is absorbed by the rubber member 12 of the ball retainer 10 and is therefore difficult to leak outside.

FIG. 5 to 8 show a second embodiment of the present invention.

A ball retainer 10A is distinguished from the first embodiment in that the inner seal portions 14 extend in the axial direction of the linear guide apparatus so as to project from the stopper portions 6. Therefore, the total length of the slider main body 2A can be sealed. Moreover, the thickness of each end cap 2B fitted with the slider main body 2A can also be sealed by the inner seal portions 14 according to the second embodiment. As a result of this design, the second embodiment is advantageous in perfectly sealing the slider including the end caps 2B. While each stopper portion 6 at the end portion of the core bar 11 of the ball retainer 10A is bent in the second embodiment, this design changes nothing substantial.

FIG. 9 shows a third embodiment of the present invention.

A ball retainer 10B is distinguished from the first embodiment in that the core member 11 is frame-shaped with a central portion 16 hollowed and that the frame-shaped core member 11 is coated with the rubber member 12. Having the same ball holding and sealing functions as those of the first embodiment, the ball retainer 10B according to the third embodiment is further advantageous in reducing the weight of the linear guide apparatus.

In addition, the third embodiment is still further advantageous in allowing the balls B to be sequentially loaded to the ball rolling grooves 4 of the slider 2 more easily by utilizing both the resiliency of a core member 11A itself as well as the resiliency of the rubber member 12 when the balls B are being loaded to the ball rolling grooves 4.

Moreover, the ball retainer formed by hollowing the central portion thereof is advantageous not only in reducing vibrations accompanied by the movement of the slider by arranging a pressing device in the space defined between the upper surface of the guide rail and the inner surface of the slider but also in keeping the retainer from interfering with the slider and the guide rail when the slider is being fixed to the guide rail.

FIG. 10 shows a fourth embodiment of the present invention.

A ball retainer 10C is distinguished from the aforementioned embodiments in that the inner seal portions 14 are arranged only on one side to seal only the upper surface 1a side of the guide rail 1. That is, there is no possibility that foreign matters deposited on the upper surface 1a of the guide rail may pass through the retainer, go round, and enter into the ball rolling grooves 3, 4 in a ball retainer whose central portion is not hollowed. Therefore, since the side of the inner surface 2a of the slider is not necessarily sealed, it makes the linear guide apparatus practical without inner seal portions 14 on both surfaces. Single-sided sealing contributes to reducing the cost of manufacture.

As described in the foregoing, the ball retainer of the present invention is characterized as forming ball holding portions and inner seal portions on both side edges thereof by coating the core member with a rubber or synthetic resin member, the inner seal portions contacting with at least an upper surface of the guide rail out of the upper surface of the guide rail and an inner surface of the slider confronting the upper surface of the guide rail. Therefore, the ball retainer of the present invention serves the double purpose of a ball retainer and a dustproof seal. That is, when the slider is released from the guide rail, the balls can be held in the ball rolling grooves of the slider securely by the ball holding portions. On the other hand, when the slider is assembled to the guide rail, the inner seal portions tightly contact with at least the upper surface of the guide rail out of the upper surface of the guide rail and the inner surface of the slider confronting the upper surface of the guide rail, thereby blocking the ingress of foreign matters into the ball rolling portions. This prevents the lubricant from being contaminated, thereby contributing to extending the life of the linear guide apparatus.

In addition to the aforementioned advantages, the plate-shaped ball retainer is advantageous in providing silent driving with noise generated from the ball rolling portions contained. Furthermore, the ball retainer formed by hollowing the central portion thereof is so resilient as to further facilitate the balls to be loaded to the ball rolling grooves of the slider, and is advantage not only in reducing vibrations accompanied by the movement of the slider by arranging a pressing device in the space defined between the upper surface of the guide rail and the inner surface of the slider but also in keeping the retainer from interfering with the slider and the guide rail when the slider is being fixed to the guide rail.

What is claimed is:

1. A linear guide apparatus, comprising:

a guide rail including a first ball rolling groove in a corner portion thereof, the first ball rolling groove extending in an axial direction of the linear guide apparatus;

a slider fitted over the guide rail so as to be movable in the axial direction relative to the guide rail and including a second ball rolling groove in an inner side surface thereof, the second ball rolling groove confronting the first ball rolling groove of the guide rail;

a plurality of balls loaded in the confronting first and second ball rolling grooves; and a ball retainer attached into the slider, the ball retainer including:

a core member formed in a substantially rectangular shape and coated with a material selected from rubber and synthetic resin, the core member having a stopper portion at a longitudinal end thereof;

a ball holding portion formed with the material along a side edge of the ball retainer for holding the balls with respect to the second ball rolling groove of the slider; and an inner seal portion formed with the material along the side edge for slidingly contacting with an upper surface of the guide rail.

2. The linear guide apparatus of claim 1, wherein the ball retainer includes first and second inner seal portions for contacting with the upper surface of the guide rail and with an inner surface of the slider confronting the upper surface of the guide rail, respectively.

3. The linear guide apparatus of claim 2, wherein the first and second inner seal portions are arrow-shaped in cross section.

4. The linear guide apparatus of claim 1, wherein the ball holding portion comprises an arcuate recessed groove.

5. The linear guide apparatus of claim 1, wherein the inner seal portion is tapered down toward an inside of the ball retainer from the side edge.

6. The linear guide apparatus of claim 1, wherein the inner seal portion extends in the axial direction so as to project from the stopper portion.

7. The linear guide apparatus of claim 1, wherein the core member is frame-shaped with a hollowed central portion.

* * * * *